UNITED STATES PATENT OFFICE.

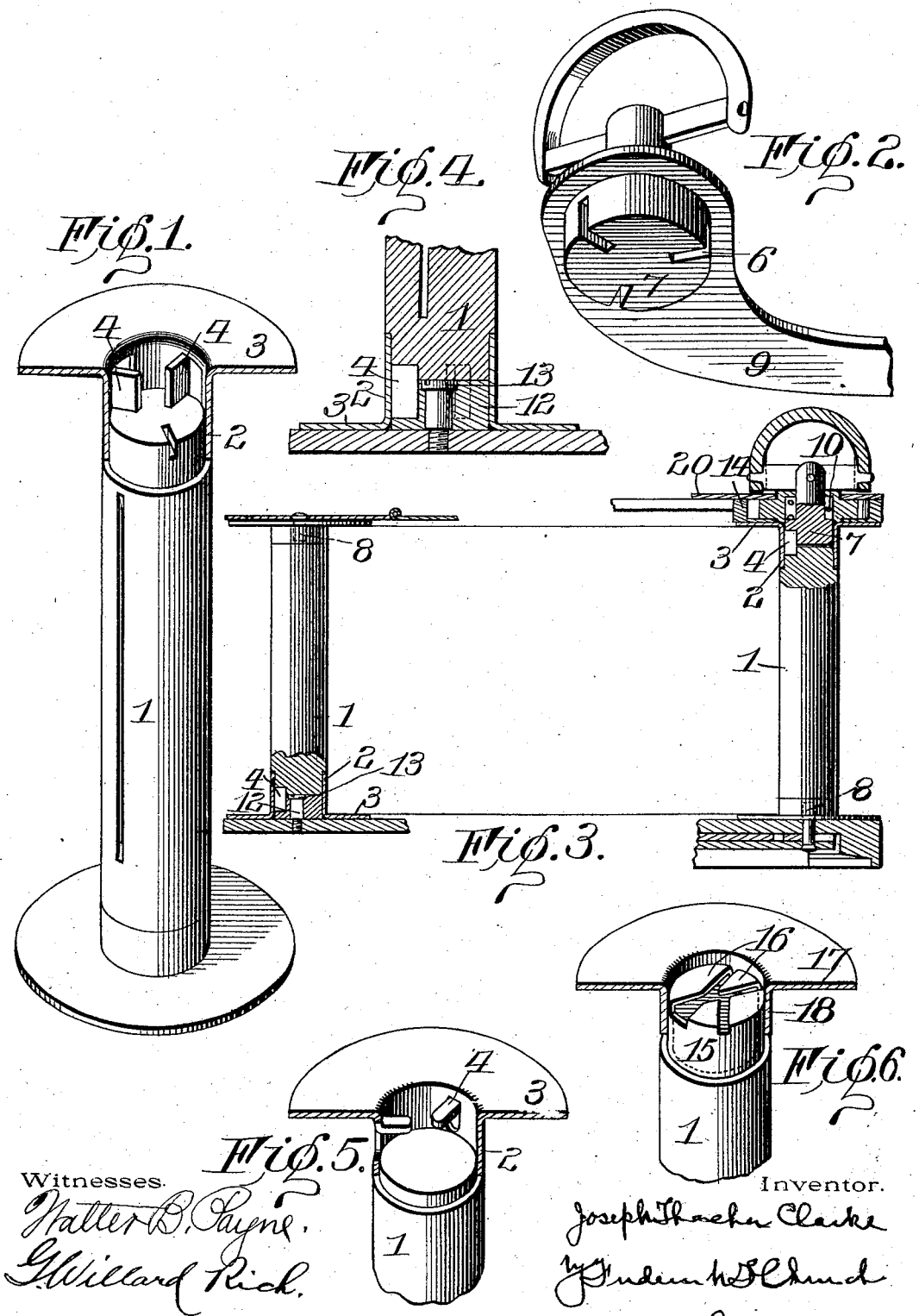

JOSEPH THACHER CLARKE, OF HARROW, ENGLAND, ASSIGNOR TO EASTMAN KODAK COMPANY OF NEW JERSEY, A CORPORATION OF NEW JERSEY.

PHOTOGRAPHIC-FILM SPOOL.

SPECIFICATION forming part of Letters Patent No. 711,617, dated October 21, 1902.

Application filed August 23, 1902. Serial No. 120,809. (No model.)

*To all whom it may concern:*

Be it known that I, JOSEPH THACHER CLARKE, a citizen of the United States, residing at Harrow, Middlesex county, England, have invented certain new and useful Improvements in Photographic-Film Spools; and I do hereby declare the following to be a full, clear, and exact description of the same, reference being had to the accompanying drawings, forming a part of this specification, and to the reference-numerals marked thereon.

My present invention relates to spools particularly adapted for containing photographic film and to be used in roll-holders or cameras and also to keys or operating devices for rotating said spool, and has for its object to improve their construction and operation whereby not only may the spools be accurately formed to fit the camera or roll-holder for which they are designed, but the proper operation of the spool is insured by the engagement with the proper key or operating device, all as will be hereinafter described and the novel features pointed out particularly in the claims.

In the accompanying drawings, Figure 1 is a perspective view, partly in section, of a film-spool provided with my improvements. Fig. 2 is a perspective view of a winding-key adapted for application to the spool shown in Fig. 1. Fig. 3 is a vertical sectional view through a portion of a photographic camera or roll-holder, showing a winding spool or roll engaged by a winding-key and a supply-spool supported on centering devices. Fig. 4 is a sectional view showing the manner of centering the end of the spool when used as a supply-spool. Figs. 5 and 6 are perspective views, partly in section, showing modifications of my invention.

Similar reference-numerals in the several figures indicate similar parts.

Heretofore the spools or reels employed for containing sensitized photographic film have generally embodied a wooden spindle having at one end a cross-slot for the application of the winding-key and at the other a cylindrical aperture for the reception of a holding center or pin, and at the ends of the spindle were provided metal cylindrical collars forced on the end of the spindle and secured by friction, by indentations, or otherwise, the outer edge of the collars being provided with light-excluding flanges of sufficient width to prevent access of light to the edges of the film wound on the spindle. In my present invention I also employ a spindle or arbor 1, preferably of wood, having the usual slot for the application of the end of the film or the paper covering thereof, and upon one or both ends of the spindle are secured metal cylinders 2, having the integral light-excluding flange 3 at the end and a plurality of integral tongues, lugs, or projections 4, cut from the body of the cylinder, extending inwardly in the body of the latter and preferably radially of the center, as shown in Figs. 1 and 5. In the present instance I have shown three such lugs or projections 4 of such dimensions as to insure firm engagement with corresponding recesses 6, formed in the ends of the operating-key 7, so as to enable the latter to positively turn the spool to wind the film. A space is preferably left between the inner proximate ends of the lugs or projections, so that they may serve as a means for centering the spool at one end, if desired, upon the pin or projection 8, arranged in the supply-chamber of the camera or roll-holder, as shown particularly in Fig. 3. The collars or cylinders may be secured to the ends of the spindles in any convenient manner, as by forcing them on, and preferably the length of the spindle is less than the total length of the spool by an amount equal to the distance from the inner ends of the lugs to the outside surface of the light-protecting flange, so that when the metal portion is forced onto the wooden spindle the end of the latter abuts against the internal projections or lugs of the cylinder, which latter serve as a convenient gage for insuring that all spools of the same kind shall be of exactly the same length. If desired, however, the lugs or projections may be forced slightly into the ends of the wooden spindle, serving to firmly connect the two and prevent independent movement.

The key in the camera-fitting may be of any suitable construction and mounted rotatably upon a spring-supporting arm 9 to enable the key to be moved longitudinally into and out of engagement with the spool, or it may be arranged to slide longitudinally in a wheel 14, mounted in a plate 20 on a stationary part of the camera, being forced inwardly by a spring 10, as shown in Fig. 3. The end of the spool opposite the key may, if desired, be provided with the usual flanged cylinder, the end of the spindle having an axial boring in the end adapted to receive a centering-pin in either the supply or the receiving chamber of the camera, or the cylinder with the lugs may be applied to both ends.

In some instances instead of having the ends of the lugs on the cylinder extend into engagement with the centering projection in the supply-chamber and in order to insure the proper arrangement of the film I provide a separate bearing-block consisting of a disk or collar 12, having radial slots therein similar to those in the key for the accommodation of said lugs and journaled loosely on the headed-pin 13, secured to the camera or holder, as shown in Fig. 4.

While I prefer that the lugs in the cylinder should have their edges extending parallel with the axis of the spindle, it will be understood that they could be punched and arranged, as shown in Fig. 5, at right angles to said axis.

As one of the objects of my invention is to form the coöperating surfaces between the key and spool of metal in order that the parts be accurately fitted and not liable to get out of adjustment, this could be accomplished in the manner shown in Fig. 6 by securing upon the end of the wooden spindle a cap or thimble 15, having at its outer end inwardly-turned lugs or projections 16, formed by punching out the end into the form of the letter K, for instance, the outer flange 17 and its cylinder 18 being forced upon or secured to this cap-piece in any suitable manner. The winding-key for coöperating with the slots or projections in this cap would of course be provided with corresponding projections or slots; but in each instance the ends of the projections would constitute bearing-surfaces to engage the centering projection in the film-supply chamber such as are now in use, if desired.

I claim as my invention—

1. A spool for photographic film embodying a spindle and having at one end a metal cylinder provided with a plurality of integral inwardly-extending lugs near the outer end.

2. A spool for photographic film embodying a spindle having at one end a metal cylinder provided with a plurality of integral inwardly-extending lugs separated at their proximate ends to form a central bearing.

3. A spool for photographic film embodying a spindle having at one end a metal cylinder provided with a radially-extending flange at the outer end and the integral inwardly-extending lugs.

4. A spool for photographic film embodying a spindle having at one end a metal cylinder provided with a radially-extending flange at the outer end and inwardly-extending lugs separated at their inner proximate ends for the application of a centering-pin.

5. A spool for photographic film embodying a spindle having at one end a metal cylinder provided at the outer end with a radially-extending light-excluding flange and the inwardly-extending lugs, said lugs being arranged between the flange and the end of the spindle.

6. A spool for photographic film embodying a spindle having light-excluding flanges at the ends and metal lugs arranged at one end, within the flange, and adapted for engagement with the wards of a winding-key.

7. A spool for photographic film, embodying a spindle having at one end a metal cylinder provided with an outwardly-extending flange and lugs cut from the material of the cylinder and turned inwardly with the edges substantially parallel with the axis of the spindle, said lugs extending between the end of the spindle and the flange and adapted for coöperation with the wards of a winding-key.

JOSEPH THACHER CLARKE.

Witnesses:
A. NUTTING,
H. D. JAMESON.